US012389144B2

(12) United States Patent
Akai et al.

(10) Patent No.: US 12,389,144 B2
(45) Date of Patent: Aug. 12, 2025

(54) EXTERNAL MEMBER, EXTERNAL MEMBER MOLDING METHOD, AND ELECTRONIC INSTRUMENT

(71) Applicant: CASIO COMPUTER CO., LTD., Tokyo (JP)

(72) Inventors: Hiroki Akai, Hino (JP); Hirokatsu Katoh, Kawasaki (JP); Takahiro Moriya, Kokubunji (JP); Yoshihiko Sato, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 327 days.

(21) Appl. No.: 18/082,986

(22) Filed: Dec. 16, 2022

(65) Prior Publication Data

US 2023/0199353 A1 Jun. 22, 2023

(30) Foreign Application Priority Data

Dec. 22, 2021 (JP) ................................ 2021-207675

(51) Int. Cl.
*H04R 1/02* (2006.01)
*H04R 7/04* (2006.01)

(52) U.S. Cl.
CPC ............... *H04R 1/023* (2013.01); *H04R 7/04* (2013.01)

(58) Field of Classification Search
CPC .... H04R 1/023; H04R 7/04; H04R 2201/029; H04R 1/345
See application file for complete search history.

(56) References Cited

U.S. PATENT DOCUMENTS

| | | | |
|---|---|---|---|
| 10,582,281 | B2 | 3/2020 | Horikiri et al. |
| 2018/0182363 | A1 | 6/2018 | Hoshino |
| 2021/0168499 | A1 | 6/2021 | Matsuba et al. |

FOREIGN PATENT DOCUMENTS

| | | | | |
|---|---|---|---|---|
| EP | 2811756 | A1 | 12/2014 | |
| EP | 2811756 | B1 * | 4/2017 | ........... H04R 1/2826 |
| JP | S57109683 | U | 7/1982 | |
| JP | H0654096 | U | 7/1994 | |
| JP | H06062693 | U | 9/1994 | |
| JP | 2012222543 | A | 11/2012 | |
| JP | 2020011645 | A | 1/2020 | |
| WO | 2018042901 | A1 | 3/2018 | |
| WO | WO-2022124032 | A1 * | 6/2022 | ............... G10H 1/32 |

OTHER PUBLICATIONS

Japanese Office Action (and English language translation thereof) dated Jan. 19, 2022, issued in counterpart Japanese Application No. 2021-207675.
Japanese Office Action (and an English language translation thereof) dated Jul. 6, 2023, issued in counterpart Japanese Application No. 2021-207675.
Extended European Search Report (EESR) dated May 19, 2023, issued in counterpart European Application No. 22213932.1.

* cited by examiner

*Primary Examiner* — Sunita Joshi
(74) *Attorney, Agent, or Firm* — Holtz, Holtz & Volek PC

(57) ABSTRACT

A rear panel of an electronic keyboard instrument has a frame portion including multiple sound radiation holes, and the frame portion has a first hole frame including a hole forming surface of the sound radiation hole and a second hole frame including a hole forming surface of the sound radiation hole which is longer in a thickness direction of the frame portion (a Y-axis direction) than the first frame.

12 Claims, 12 Drawing Sheets

EXTERNAL MEMBER, EXTERNAL MEMBER MOLDING METHOD, AND ELECTRONIC INSTRUMENT

CROSS-REFERENCE TO RELATED APPLICATION

This patent application is based upon and claims the benefit of priority under 35 USC 119 to Japanese Patent Application No. 2021-207675 filed on Dec. 22, 2021, and the content thereof, including the specification, claims, drawings and abstract, is incorporated herein by reference in its entirety.

BACKGROUND

Technical Field

The present disclosure relates to an external member, an external member molding method, and an electronic instrument.

Description of the Related Art

An external member including multiple sound radiation holes like a speaker cover or net has conventionally been used for a sound generating or radiation device such as an electronic instrument or a radio. For example, JP-UM-A-6-62693 discloses a speaker net in which multiple circular sound radiation holes are disposed to be staggered in a zigzag grid-like pattern. This speaker net is attached to a cabinet including a sound hole portion in such a manner as to cover the sound hole portion of the cabinet. A speaker is disposed inside the sound hole portion.

SUMMARY

According to an aspect of the present disclosure, there is provided an external member including a frame portion comprising multiple sound radiation holes, wherein the frame portion includes a first hole frame comprising a hole forming surface of the sound radiation hole, and a second hole frame including a hole forming surface of the sound radiation hole which is longer in a thickness direction of the frame portion than the first hole frame.

According to another aspect of the present disclosure, there is provided an electronic instrument including the external cover described above.

According to a further aspect of the present disclosure, there is provided an external member molding method including clamping a mold made up of a core mold including a first pin which corresponds to the hole forming surface of the first hole frame and a second pin which corresponds to the hole forming surface of the second hole frame, and a cavity mold, and molding the frame portion including the multiple sound radiation holes including the first hole frame and the second hole frame by injecting a molten resin into the mold.

DESCRIPTION OF THE EMBODIMENT

Figure 1:
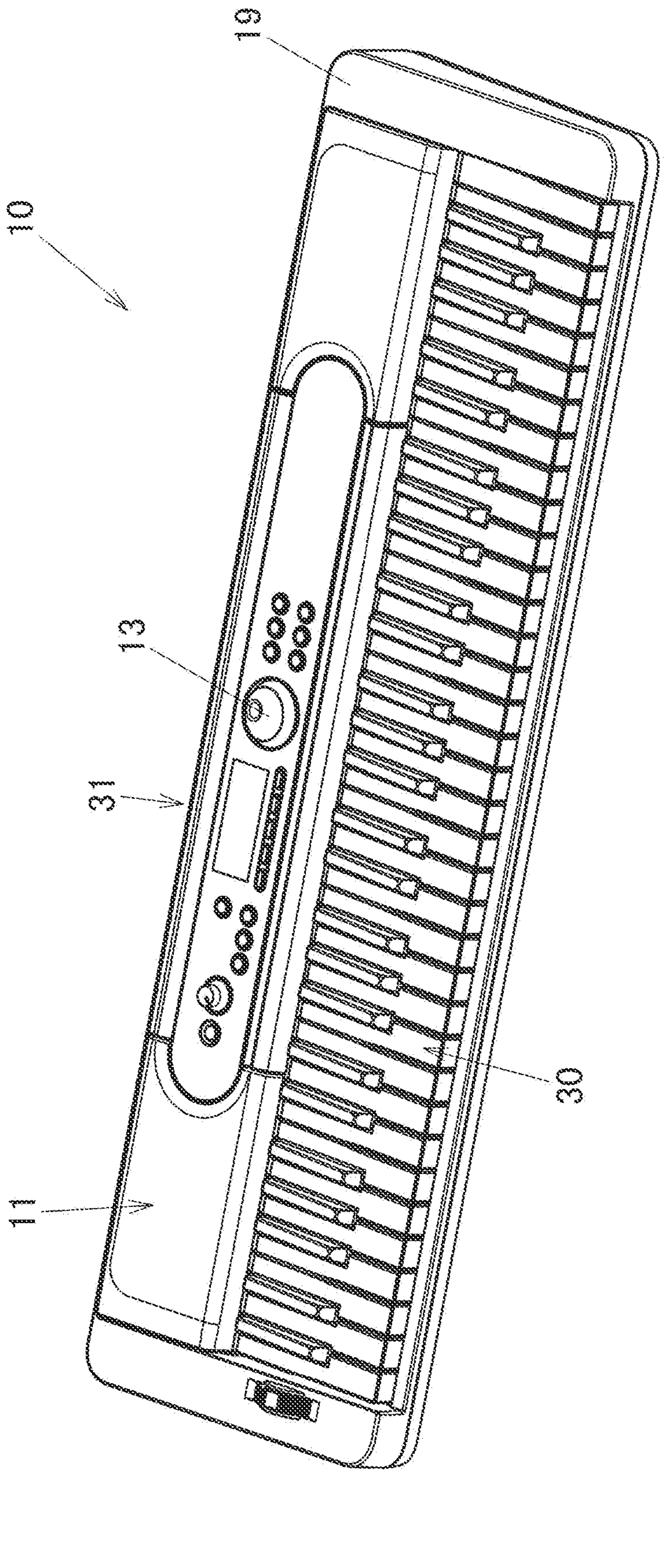
FIG. 1 is a perspective view of an electronic keyboard instrument including an external member (a rear panel) according to an embodiment or application example of the present disclosure.
Figure 2:
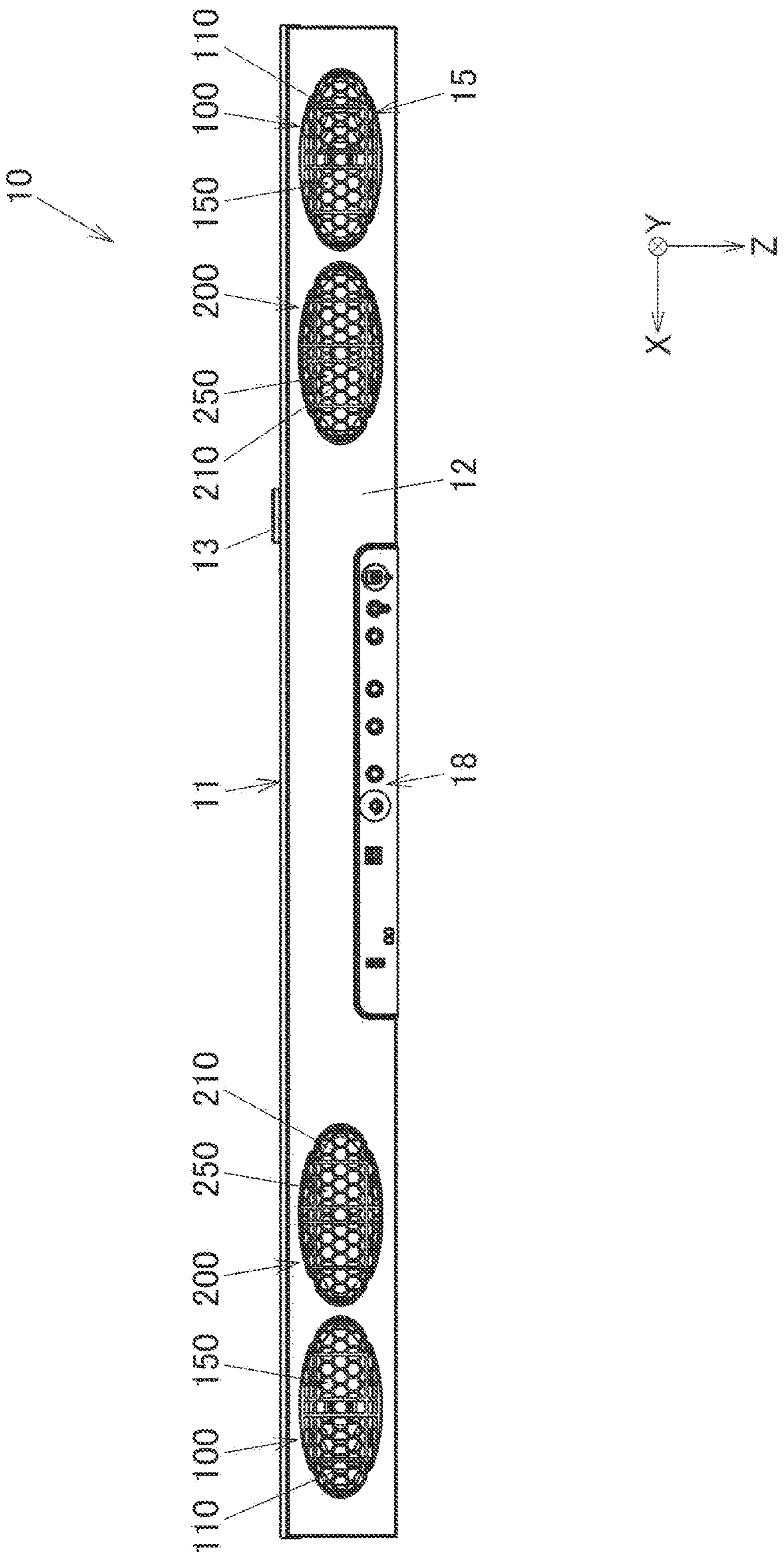
FIG. 2 is a rear view of the electronic keyboard instrument including the external member (the rear panel) according to the application example of the present disclosure.

Hereinafter, referring to accompanying drawings, an embodiment or application example of the present disclosure will be described. An electronic keyboard instrument 10 (an electronic instrument), which is a sound generating device, shown FIG. 1 includes a 61-note keyboard 30 and an instrument case 19. A control section 31 including an adjustment control 13 is provided on an upper surface 11 of the electronic keyboard instrument 10. As shown in FIG. 2, the instrument case 19 includes a rear panel 15, which is an external member, and a rear cover 12, which is disposed on an outer side of the rear panel 15. A connector panel 18, which includes a connection port for an AC adaptor, connection ports for other sound generating or radiation devices, and USB connection ports, is provided at a central portion of a lower part of the rear panel 15 of the electronic keyboard instrument panel 10.

In the following description, an up-down direction of the electronic keyboard instrument 10 is referred to as a Z-axis (a lower side is referred to as a positive side of the Z-axis), a left-right direction of the electronic keyboard instrument 10, which is a direction in which keys are aligned, is referred to as an X-axis (a high-note keys side is referred to as a positive side of the X-axis), and a front-rear direction of the electronic keyboard instrument 10, which is a front-rear direction of a key, is referred to a Y-axis (a nearer side of the key is referred to as a positive side of the Y-axis).

Two first sound radiation sections 100 and two second sound radiation sections 200 are provided in the rear panel 15 of the electronic keyboard instrument 10. Each first sound radiation section 100 has a frame portion 110 which includes multiple sound radiation holes 150, and each second sound radiation section 200 has a frame portion 210 which includes multiple sound radiation holes 250. The first sound radiation section 100 and the second sound radiation section 200 are disposed in series in a direction (an X-axis direction in FIG. 2) which is at right angles to an axial direction of the sound radiation holes 150, 250 (A Y-axis direction in FIG. 2, that is, a thickness direction of the frame portions 110, 210). Then, the two first sound radiation sections 100 are disposed outwards at outer sides (sides farther away from the connector panel 18) of the electronic keyboard instrument 10 in the X-axis direction, and the two second sound radiation sections 200 are disposed inwards at inner sides (sides closer to the connector panel 18) of the electronic keyboard instrument 10 in the X-axis direction. The first sound radiation section 100 and the second sound radiation section 200 which make up a pair at a left side and the first sound radiation section 100 and the second sound radiation section 200 which make up a pair at a right side of the electronic keyboard instrument 10 are provided symmetrically with each other.

Figure 4:
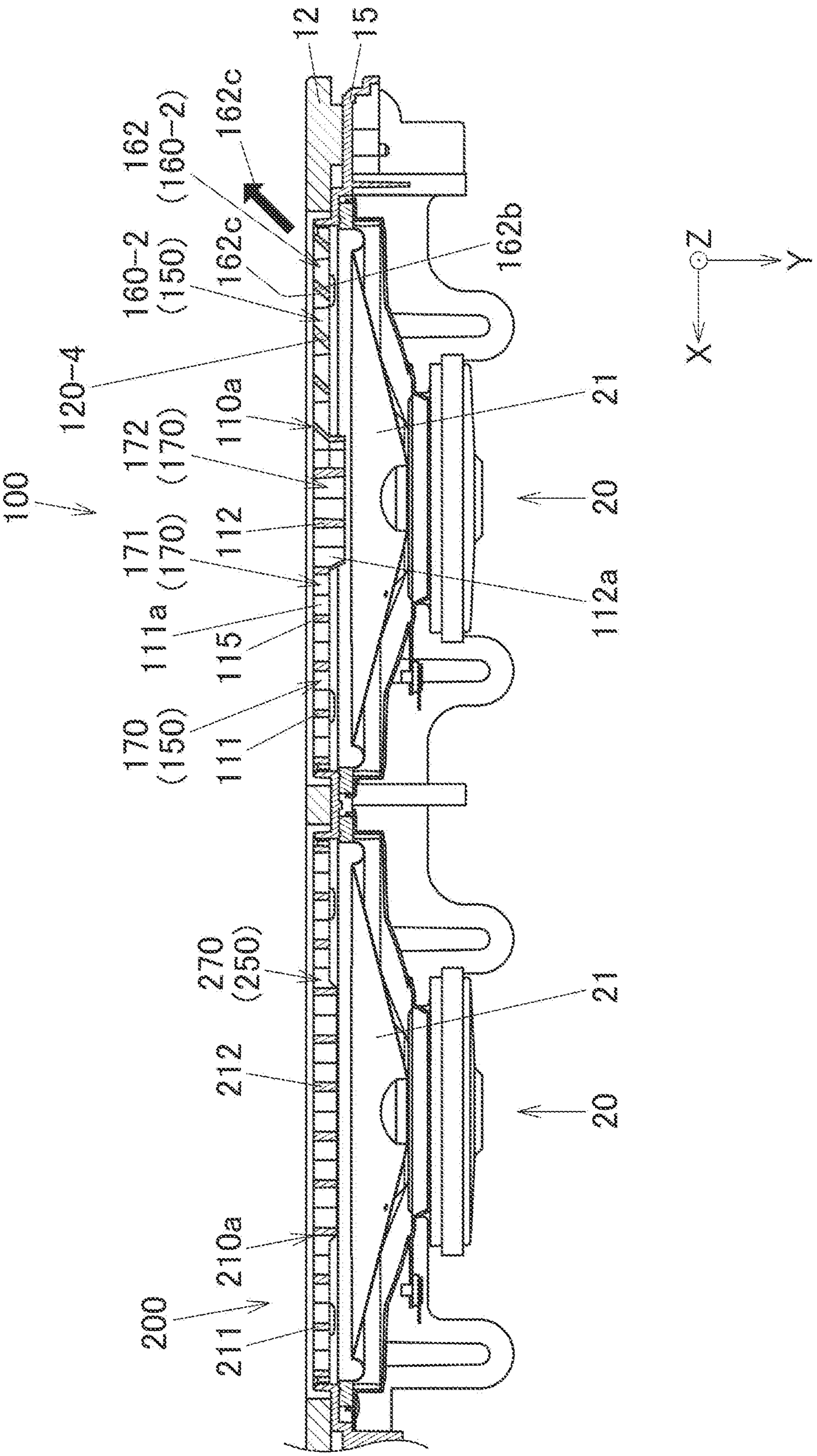
FIG. 4 is a sectional view of the external member (the rear panel) according to the application example of the present disclosure taken along a line IV-IV in FIG. 3.

As shown in FIG. 4, a sound radiation apparatus 20 is provided on an inner side (the positive side of the Y-axis) of the rear panel 15 in such a manner as to correspond individually to the first sound radiation section 100 and the second sound radiation section 200. In the present application example, the sound radiation apparatus 20 is a speaker. The rear panel 15 (the first sound radiation sections 100, the second sound radiation sections 200) is disposed to lie close to the sound radiation apparatuses 20. The rear cover 12 is provided on the outer side of the rear panel 15. In the rear cover 12, portions corresponding to the first sound radiation sections 100 and the second sound radiation sections 200 are opened. Although not shown, a saran net can be provided on an outer surface of the rear cover 12.

Figure 3:
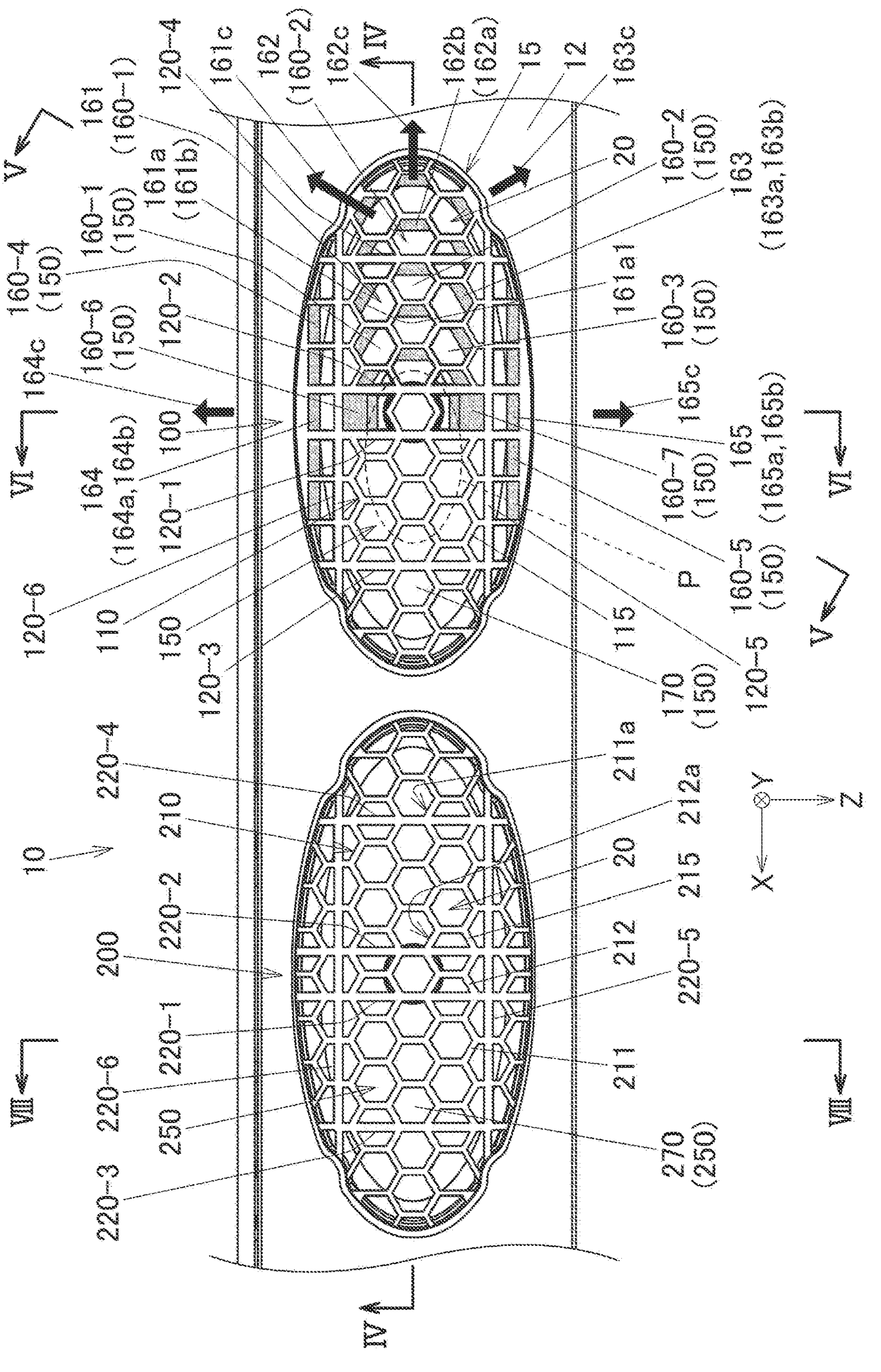
FIG. 3 is an enlarged rear view of the electronic keyboard instrument, showing a first sound radiation section and a second sound radiation section which are provided in the external member (the rear panel) according to the application example of the present disclosure.

As shown in FIG. 3, the frame portions 110, 210 are provided in such a manner that an external shape of an outer edge has a substantially oval shape whose major axis extends in the X-axis direction. The frame portions 110, 210 have multiple frames 115, 215, respectively. When referred to here, the frames 115, 215 denote sides making up, for example, the sound radiation holes 150, 250, respectively, which have a hexagonal shape. The sound radiation holes 150, 250 are provided by areas which are surrounded by the multiple frames 115, 215, respectively. In addition, as shown in FIG. 4, surfaces (outer surfaces 110*a*, 210*a*) of outer sides (a negative side of the Y-axis direction) of the frame portions 110, 210 are formed flat and level with each other.

The first sound radiation section 100 will be described. As shown in FIG. 3, the sound radiation holes 150 provided in the frame portion 110 of the first sound radiation section 100 include multiple first sound radiation holes 160-1 to multiple sixth sound radiation holes 160-6, and multiple isomorphic sound radiation holes 170. The first sound radiation section 100 includes the multiple isomorphic sound radiation holes 170 which are provided on an inner side thereof (a side facing the connector panel 18) in a direction (the X-axis direction) which is at right angles to the thickness direction (the Y-axis direction) of the frame portion 110. The frame portion 110 of the first sound radiation section 100 includes straight-line frames 120-1 to 120-6, which are provided to extend long in a straight line. The straight-line frames 120-1 to 120-4 are provided to extend in the Z-axis direction in parallel to one another in such a manner as to be connected to the outer edge of the frame portion 110. The straight-line frames 120-1, 120-2 are provided to be spaced a predetermined distance apart from each other at a substantially central portion of the frame portion 110 in the X-axis direction, and the straight-line frame 120-1 is disposed inwards, while the straight-line frame 120-2 is disposed outwards.

The straight-line frame 120-3 is disposed inwards of the straight-line frame 120-1 in the x-direction, while the straight-line frame 120-4 is disposed outwards of the straight-line frame 120-2 in the X-axis direction. The straight-line frame 120-4 also include a sloping portion (a second sloping portion 162*b*) at a portion which is superposed on one of sides of a second sound radiation hole 160-2 which form a hexagonal shape. The straight-line frames 120-5, 120-6 are provided to extend in the X-axis direction in parallel to each other in such a manner as to be connected to the outer edge of the frame portion 110. The straight-line frames 120-5, 120-6 are provided in the vicinity of lower and upper outer edges of the frame portion 110 in the Z-axis direction, respectively in such a manner that the straight-line frame 120-5 lies on a lower side, while the straight-line frame 120-6 lies on an upper side.

The multiple polygonal or substantially hexagonal isomorphic sound radiation holes 170 are provided substantially into a honeycomb configuration at a portion of the frame portion 110 which lies inwards in the X-axis direction with respect to the straight-line frame 120-1, which is disposed at a central portion of the frame portion 110, and between the lower and upper straight-line frames 120-5, 120-6. As shown in FIG. 4, the isomorphic sound radiation hole 170 is provided to have substantially the same shape at an inner side and an outer side thereof in an axial direction (the Y-axis direction) of the sound radiation hole 150. Here, when referred to in relation the isomorphic sound holes 170, 171, 270, and the like, the isomorphic sound hole means a hole having substantially the same shape at an inner side and an outer side thereof in the axial direction (the Y-axis direction, that is, the thickness direction of the frame portion 110) of the sound radiation hole 150. The isomorphic sound radiation holes 170 which connect to the outer edge of the frame portion 110 or the straight-line frames 120-5, 120-6 are provided to have a deformed substantially hexagonal shape or a shape resulting when the substantially hexagonal shape is cut into halves.

On the other hand, multiple polygonal or substantially hexagonal first sound radiation holes 160-1 to third sound radiation holes 160-3 are provided substantially into a honeycomb configuration at a portion of the frame portion 110 which lies outwards in the X-axis direction with respect to the straight-line frame 120-2 and between the straight-line frames 120-5, 120-6. The multiple first sound radiation holes 160-1 to third sound radiation holes 160-3 are each aligned in the X-axis direction, while being arranged in three rows in the Z-axis direction. Referring to FIG. 3, the multiple first sound radiation holes 160-1 are aligned horizontally in an upper row, the multiple second sound radiation holes 160-2 are aligned horizontally in a middle row, and the multiple third sound radiation holes 160-3 are aligned horizontally in a lower row. Here, in FIG. 3, sloping surfaces of the first sound radiation holes 160-1 to seventh sound radiation holes 160-7 are shown as being shaded.

Figure 5:
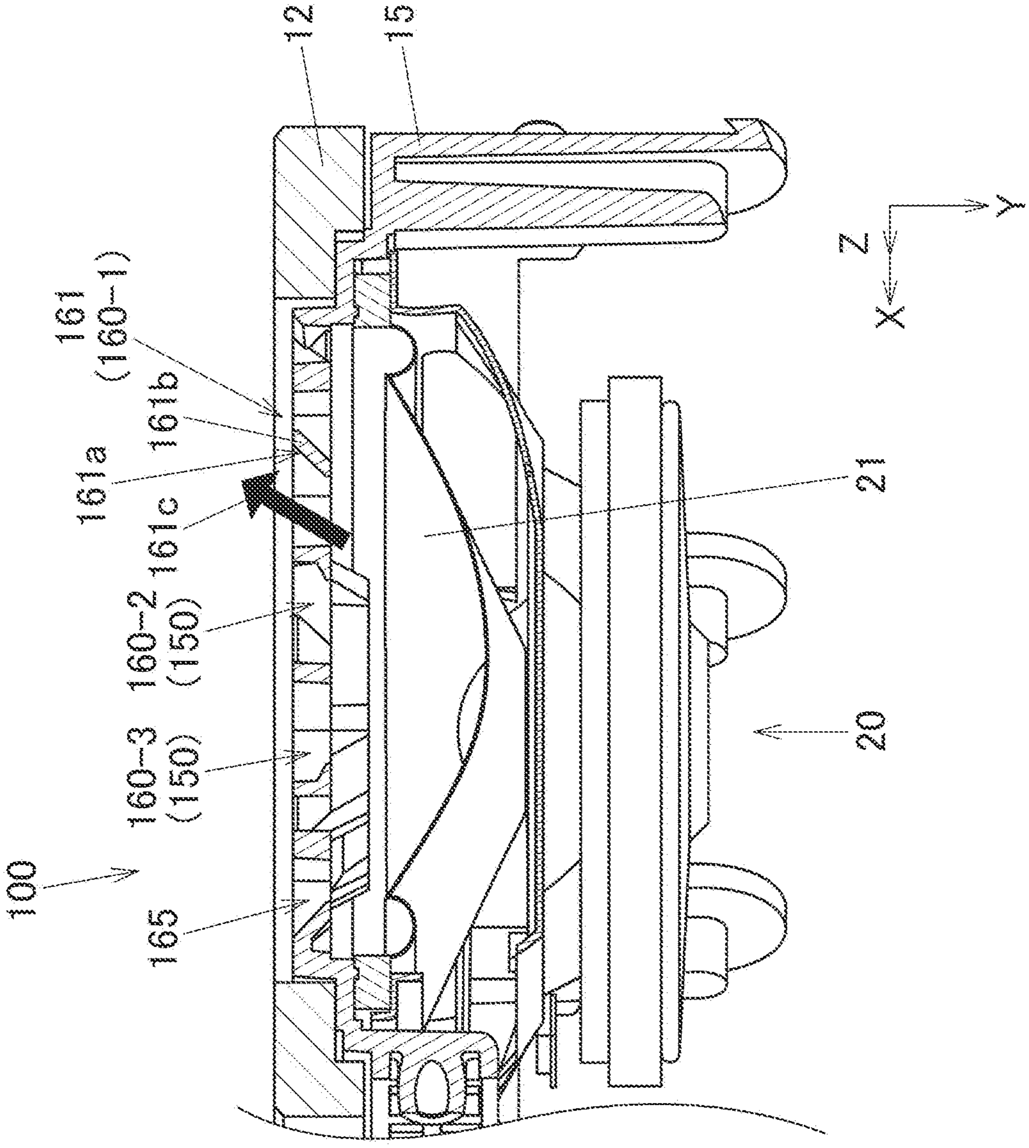
FIG. 5 is a sectional view of the external member (the rear panel) according to the application example of the present disclosure taken along a line V-V in FIG. 3.

The first sound radiation hole 160-1 will be described by taking a first sound radiation hole 161 in the first sound radiation holes 160-1 which is shown in a sectional view in FIG. 5 for example. The first sound radiation hole 161 has a first sloping portion 161*b* including a first sloping surface 161*a* which is disposed to slope down from the thickness direction of the frame portion 110 which is an axial direction of the first sound radiation hole 161 (the Y-axis direction, that is, the thickness direction of the frame portion 110) within an area in the first sound radiation hole 161 (within an area inside the substantially hexagonal shape when seen from above in FIG. 3). A first direction 161*c*, which is a sloping direction of the first sloping surface 161*a* (a direction at right angles to an edge line 161*a*1 of the first sloping surface 161*a* inside the hole, which is a direction directed from an inner side to an outer side of the first sound radiation hole 161, that is, a sound radiation direction), is a direction which divides an angle formed between a negative side of the X-axis and a negative side of the Z-axis substantially into half angles.

Similarly, a second sound radiation hole 160-2 will be described by taking a second sound radiation hole 162 shown in the sectional view in FIG. 4 for example. The second sound radiation hole 162 has a second sloping portion 162*b* including a second sloping surface 162*a* which is disposed to slope down from the thickness direction of the frame portion 110 which is an axial direction of the second sound radiation hole 162 (the Y-axis direction) within an area in the second sound radiation hole 162. Then, a second direction 162*c*, which is a sloping direction of the second sloping surface 162*a*, constitutes a direction of the negative side of the X-axis.

Also, similarly, a third sound radiation hole 160-3 (a third sound radiation hole 163) has a third sloping portion 163*b* including a third sloping surface 163*a*, and a third direction 163*c*, which is a sloping direction of the third sloping surface 163*a*, constitutes a direction which divides an angle formed between the negative side of the X-axis and a positive side of the Z-axis substantially into half angles. The first direction 161*c*, the second direction 162*c*, and the third direction 163*c* constitute different directions from one another.

On the other hand, multiple quadrangular fourth sound radiation holes 160-4 and multiple quadrangular fifth sound radiation holes 160-5 are disposed on outer sides of the upper straight-line frame 120-6 and the lower straight-line frame 120-5, respectively. In the fourth sound radiation hole 160-4 (a fourth sound radiation hole 164), a fourth direction 164*c*, which is a direction of the positive side of the Z-axis, constitutes a sloping direction of a fourth sloping surface 164*a* of a fourth sloping portion 164*b*. In the fifth sound radiation hole 160-5 (a fifth sound radiation hole 165), a fifth direction 165*c*, which is a direction of the negative side of the Z-axis, constitutes a sloping direction of a fifth sloping surface 165*a* of a fifth sloping portion 165*b*. The fourth sloping portion 164*b* and the fifth sloping portion 165*b* include the sloping surfaces (the fourth sloping surface 164*a*, the fifth sloping surface 165*a*) which are both disposed to slope down from the thickness direction of the frame portion 110.

Also, on the other hand, an isomorphic sound radiation hole 172 is provided substantially at a central portion of the frame portion 110 which is defined between the central straight-line frames 120-1, 120-2 in the Z-axis direction and the X-axis direction. The sixth sound radiation hole 160-6 and the seventh sound radiation hole 160-7, which each have a substantially rectangular shape which is elongated in the Z-axis direction, are provided at an upper side (the negative side) and a lower side (the positive side) of the isomorphic sound radiation hole 172 in the Z-axis direction, respectively.

Figure 6:
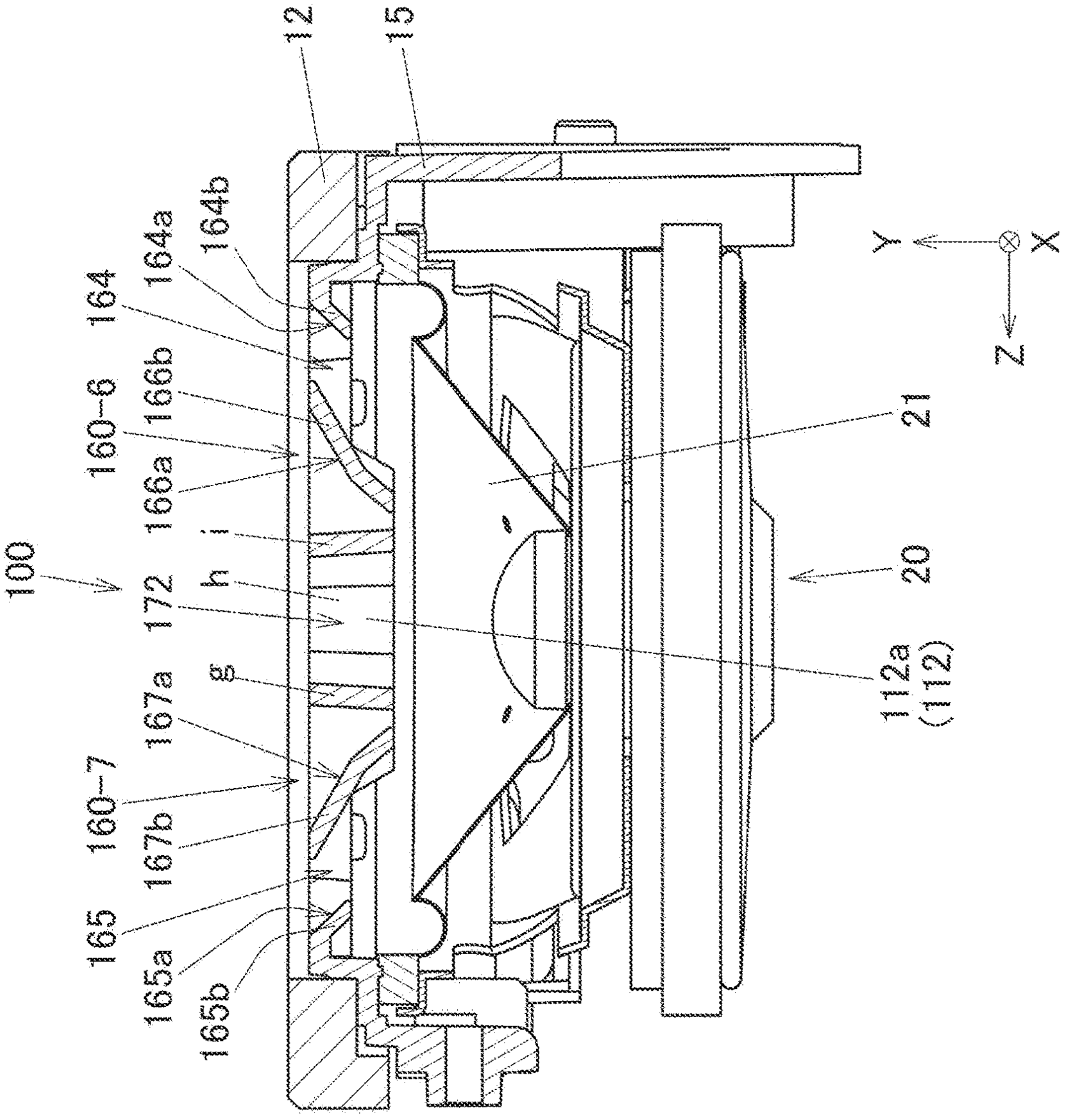
FIG. 6 is a sectional view of the external member (the rear panel) according to the application example of the present disclosure taken along a line VI-VI in FIG. 3.

As shown in FIG. 6, a sixth sloping surface 166*a* of a sixth sloping portion 166*b* of the sixth sound radiation hole 160-6 is disposed to slope down from the thickness direction of the frame portion 110. In other words, the sixth sloping surface 166*a* is provided in such a manner as to expand from the inner side towards the outer side of the frame portion 110. The sixth sloping portion 166*b* includes a bent portion which is provided in such a manner as to be bent in the expanding direction. Similarly, a seventh sloping surface 167*a* of a seventh sloping portion 167*b* of the seventh sound radiation hole 160-7 includes a bent portion, which is similar to that described above, and is disposed to slope down from the thickness direction of the frame portion 110. A sloping direction of the sixth sloping surface 166*a* of the sixth sound radiation hole 160-6 is the same as the fourth direction 164*c*. A sloping direction of the seventh sloping surface 167*a* of the seventh sound radiation hole 160-7 is the same as the fifth direction 165*c*. The sloping portions (the sixth sloping portion 166*b* and the seventh sloping portion 167*b*) which include the sloping surfaces (the sixth sloping surface 166*a* and the seventh sloping surface 167*a*) are both provided between second hole frames 112, which will be described later. Then, the sloping portions (the sixth sloping portion 166*b* and the seventh sloping portion 167*b*) are provided to make a pair so that the sloping surfaces (the sixth sloping surface 166*a* and the seventh sloping surface 167*a*) face each other.

In this way, as shown in FIG. 3, the sound radiation directions from the first sound radiation section 100 include a right-upward direction (the first direction 161*c*) defined by the first sound radiation hole 160-1, a rightward direction (the second direction 162*c*) defined by the second sound radiation hole 160-2, a right-downward direction (the third direction 163*c*) defined by the third sound radiation hole 160-3, an upward direction (the fourth direction 164*c*) defined by the fourth sound radiation hole 160-4 and the sixth sound radiation hole 160-6, and a downward direction (the fifth direction 165*c*) defined by the fifth sound radiation hole 160-5 and the seventh sound radiation hole 160-7. As a result, sounds radiated from the first sound radiation section 100 can spread widely.

Figure 7A:
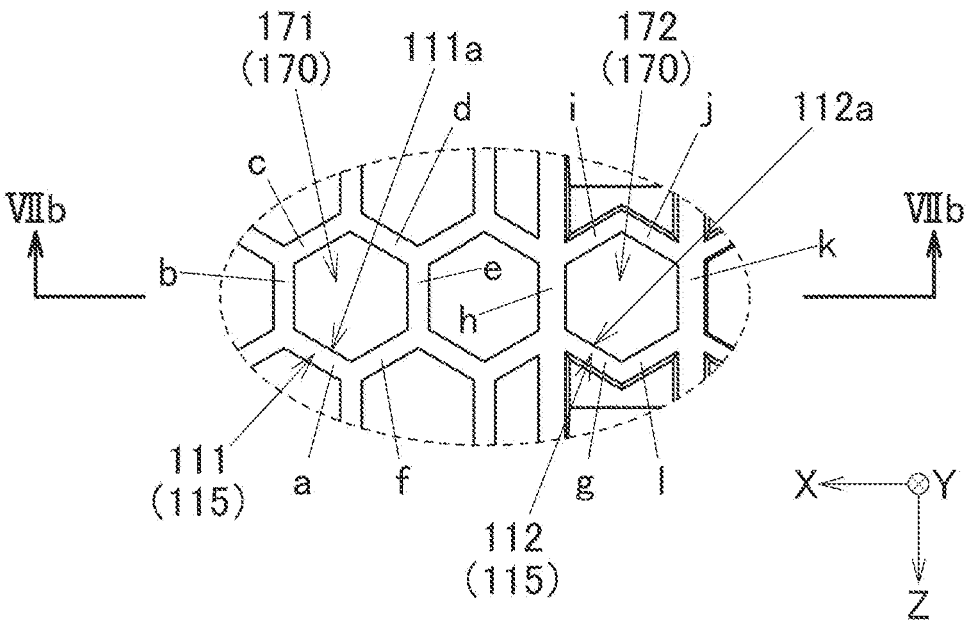
FIG. 7A is an enlarged rear view of a portion P in FIG. 3, which is a partially enlarged view of isomorphic sound radiation portions of the second sound radiation section in the external member (the rear panel) according to the application example of the present disclosure.

Also, here, heights (length in the thickness direction of the frame portion 110 (the Y-axis direction)) of the multiple frames 115 which make up the frame portion 110 of the first sound radiation section 100 will be considered. This will be described by taking isomorphic sound radiation holes 171, 172 shown in FIGS. 7A and 7B for example. The multiple frames 115 which make up the frame portion 110 of the first sound radiation section 100 include first hole frames 111 and second hole frames 112 which include hole forming surfaces which define a sound radiation hole 150. As shown in FIG. 7A, which is an enlarged view of a portion P in FIG. 3, an isomorphic sound radiation hole 171 is made up of respective hole forming surfaces 111*a* of six first hole frames 111 (denoted by reference signs a to f). Similarly, an isomorphic sound radiation hole 172 is made up of respective hole forming surfaces 112*a* of six second hole frames 112 (denoted by reference signs g to l). Here, the hole forming surfaces 111*a*, 112*a* are side surfaces of a hole which extends in the thickness direction of the frame portion 110 (the Y-axis direction). As a result, a length of the hole forming surface is considered based on the thickness direction of the frame portion 110, even though the hole forming surface is shaped to expand as it extends.

Figure 7B:
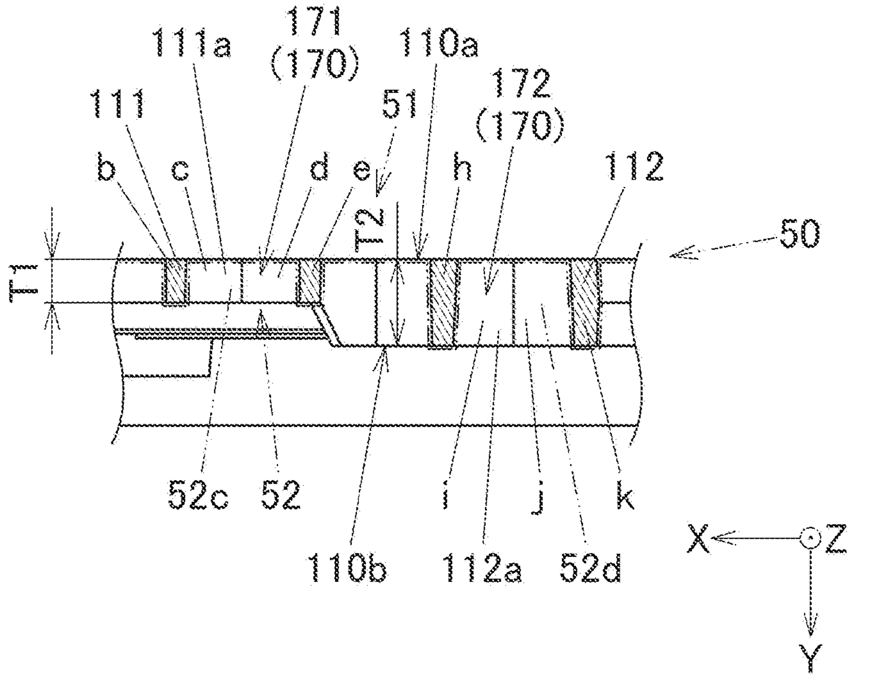
FIG. 7B is a sectional view taken along a line VIIb-VIIb in FIG. 7A, which is a partially enlarged view of the isomorphic sound radiation portions of the second sound radiation section in the external member (the rear panel) according to the application example of the present disclosure.

Then, as shown in FIG. 7B, a length T2 of the hole forming surface 112*a* of the second hole frame 112 in the Y-axis direction of the isomorphic sound radiation hole 172 (the thickness direction of the frame portion 110) is longer than a length T1 of the hole forming surface 111*a* of the first hole frame 111 of the isomorphic sound radiation hole 111*a* in the thickness direction of the frame portion 110. Since the outer surface 110*a* of the frame portion 110 is formed into a flat plane, an inner surface 110*b* of a central portion of the frame portion 110 is made to protrude at the location of the second hole frame 112. As shown in FIG. 4, the second hole frame 112 can be provided in such a manner as to correspond to a central recessed portion of a speaker cone 21 of the sound radiation apparatus 20. Here, the second hole frame 112 includes a portion which is situated in an interior portion of the speaker cone 21. The first hole frame 111 is not situated in the interior portion of the speaker cone 21.

Subsequently, the second sound radiation section 200 will be described. Sound radiation holes 250 provided in the frame portion 210 of the second sound radiation section 200 are made up of multiple isomorphic sound radiation holes 270. In other words, the second sound radiation section 200 includes the frame portion 210 having sound radiation holes 250 which are made up of the isomorphic sound radiation holes 270 in place of the multiple sound radiation holes 150 including the first sound radiation hole 160-1 to the seventh sound radiation hole 160-7 of the first sound radiation section 100. The multiple isomorphic sound radiation holes 270 each have a polygonal or hexagonal shape and are formed substantially into a honeycomb configuration. Additionally, as with the first sound radiation section 100, straight-line frames 220-1 to 220-6 are provided in the frame portion 210 of the second sound radiation section 200.

Figure 8:
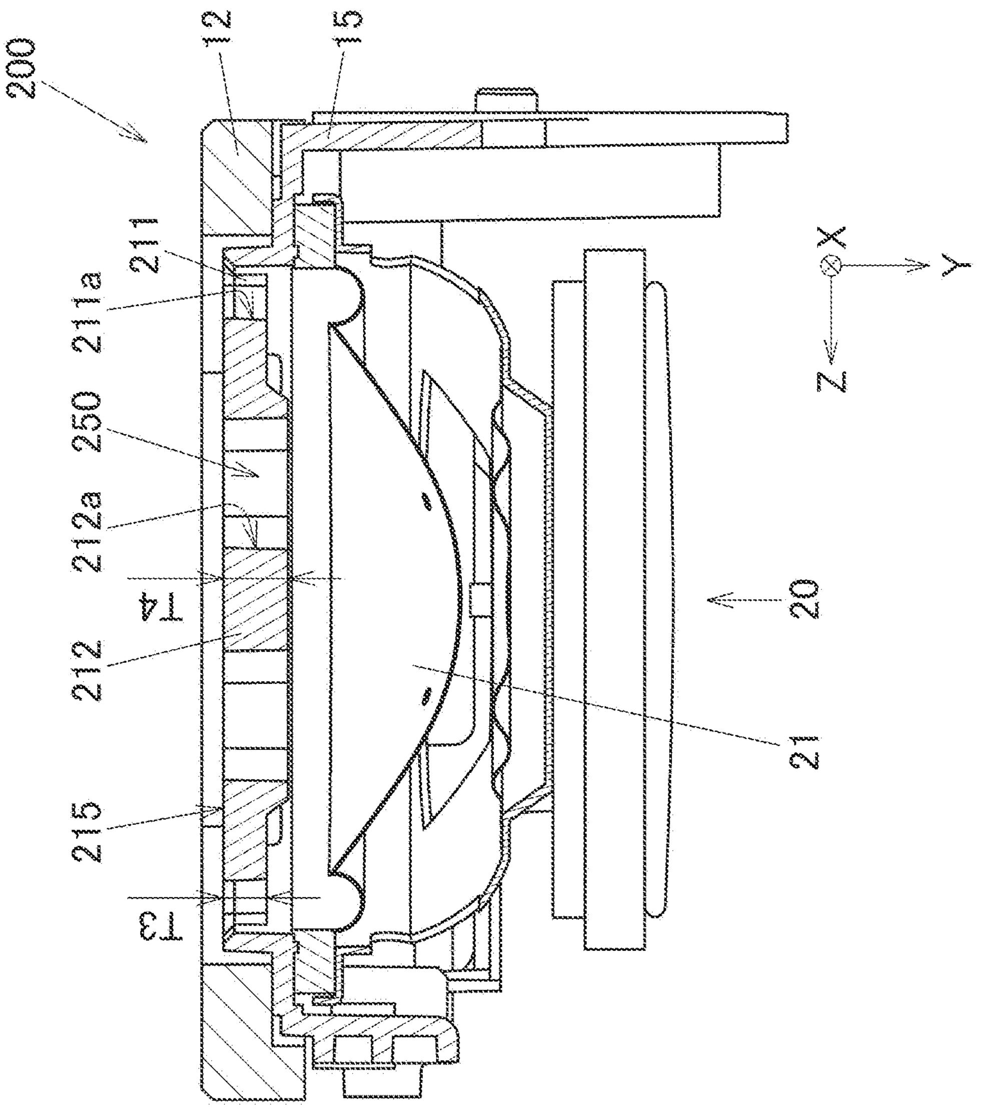
FIG. 8 is a sectional view of the external member (the rear panel) according to the application example of the present disclosure taken along a line VIII-VIII in FIG. 3.
Figure 9:
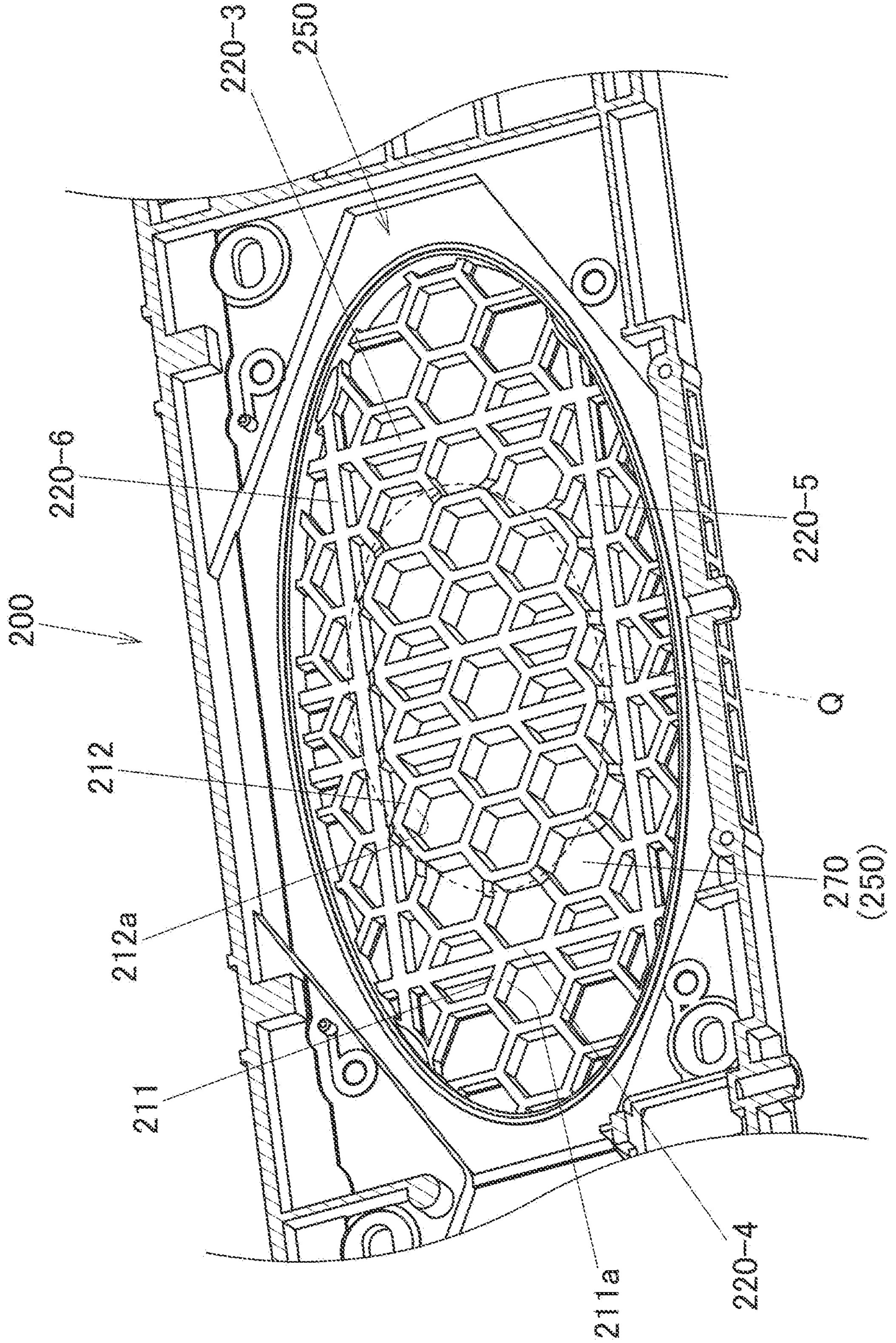
FIG. 9 is a perspective view of the second sound radiation section of the external member (the rear panel) according to the application example of the present disclosure as seen from an inner side thereof.

Next, as shown in FIG. 9, frames 215 of the second sound radiation section 200 include first frames 211 and second frames 212 which include hole forming surfaces 211*a*, 212*a* of sound radiation holes 250, respectively. As shown in FIG. 8, a length T4 of the hole forming surface 212*a* of the second hole frame 212 in an axial direction of the sound radiation hole 250 (the Y-axis direction, a thickness direction of the frame portion 210) is longer than a length T3 of the hole forming surface 211*a* of the first hole frame 211 in the thickness direction of the frame portion 210 (the Y-axis direction). In addition, the length T4 is shorter than the length T2.

Since the second hole frame 112 is given the protruding shape, when seen from the side, with a view to spreading sounds as by the sixth sound radiation hole 160-6 and the seventh sound radiation hole 160-7, the sloping surface is provided long, which results in the fact that the length T2 is made relatively long. On the other hand, since the frame 215 of the second sound radiation section 200 does not have to spread sounds from the viewpoint of sound characteristics, the length T4 is made shorter than the length T2. The disposition of the frame portions 110, 210 is not limited to the application example, and hence, the frame portions 110, 210 can be disposed differently and the lengths T2, T4 can also be changed in accordance with a desired sound characteristic.

In the second sound radiation section 200, a predetermined area Q lying substantially at a central portion of the frame portion 210 is made up of the second hole frames 212 so as to increase the strength of the frame portion 210. In addition, as shown in FIG. 4, the second hole frames 212 can be provided in such a manner as to correspond to the central recessed portion of the speaker cone 21.

Here, the rear panel 15 is molded from a resin through injection molding. As this occurs, a draft expanding from the outer side towards the inner side of the rear panel 15 is provided on hole forming surfaces of the sound radiation holes 150, 250. For example, as shown in FIGS. 7B and 8, a draft is provided on the hole forming surfaces 111*a*, 112*a*, 211*a*, 212*a* as a result of the hole forming surfaces 111*a*, 112*a*, 211*a*, 212*a* expanding slightly from the outer side towards the inner side of the rear panel 15.

Figure 10:
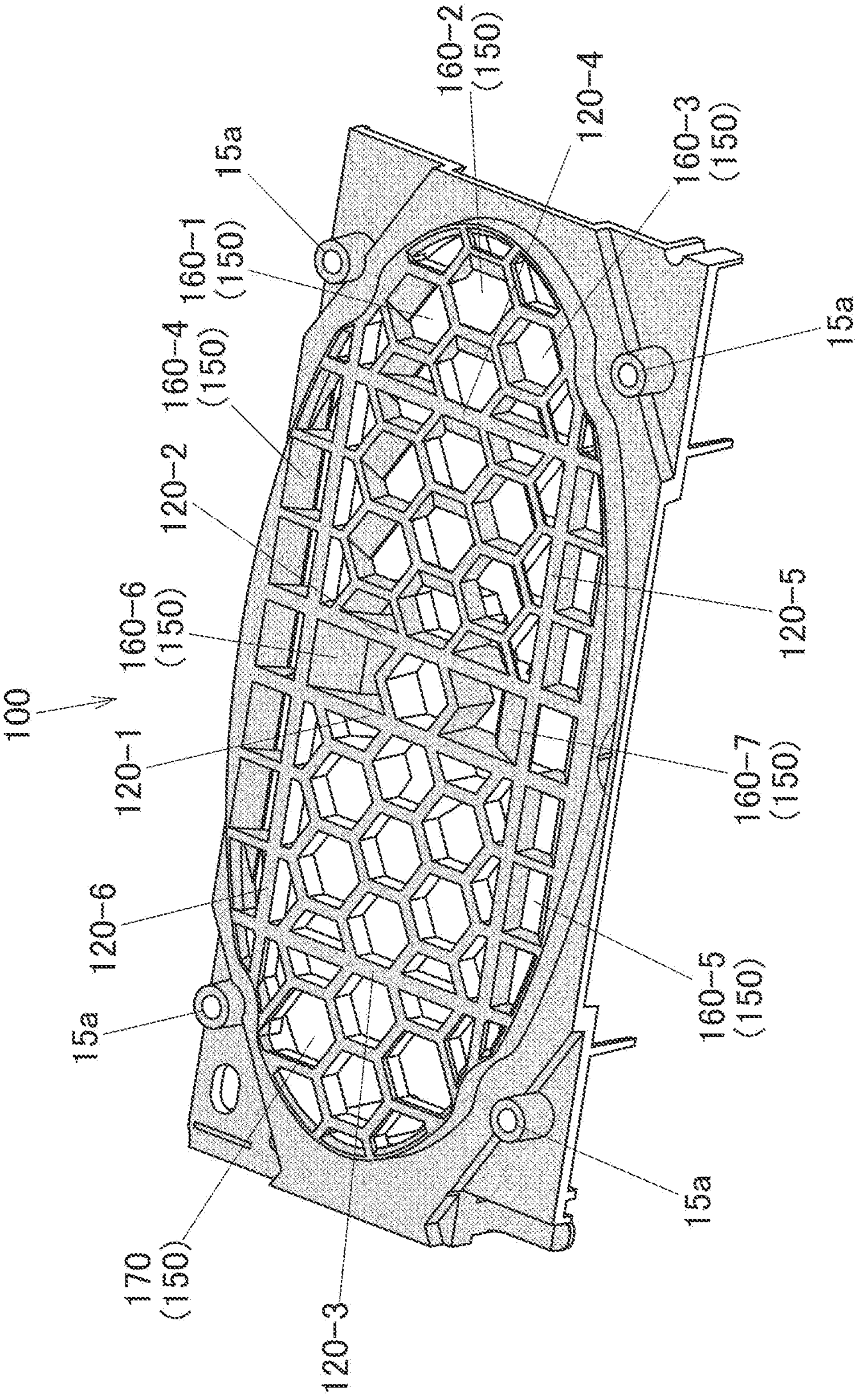
FIG. 10 is a perspective view of the first sound radiation section of the external member (the rear panel) according to the application example of the present disclosure as seen from a front side (an outer side) thereof, in which surfaces to be molded by a core mold are shown as left blank or white, while surfaces to be molded by a cavity mold are shown as shaded.
Figure 11:
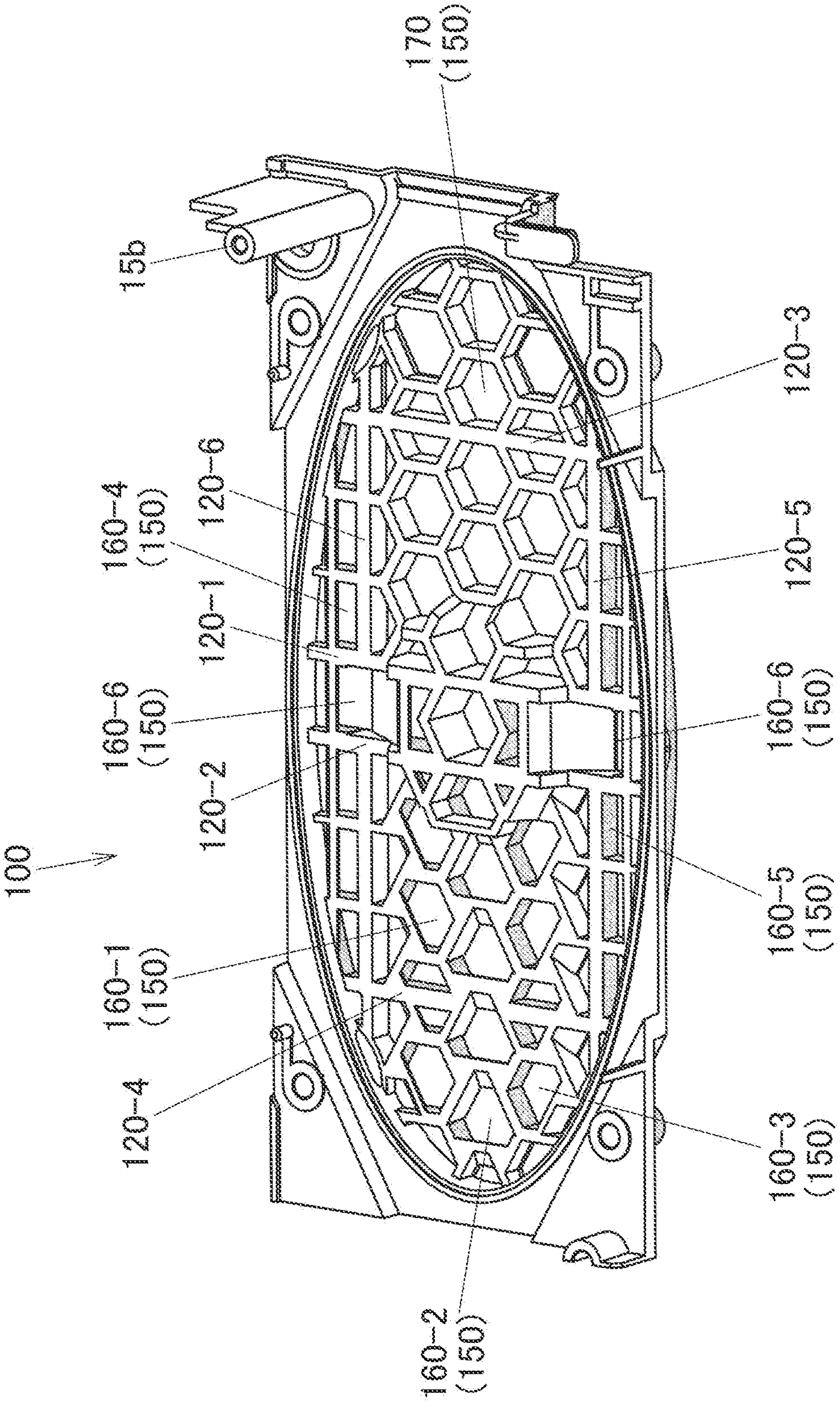
FIG. 11 is a perspective view of the first sound radiation section of the external member (the rear panel) according to the application example of the present disclosure as seen from a rear side (an inner side) thereof, in which surfaces to be molded by the core mold are shown as left blank or white, while surfaces to be molded by the cavity mold are shown as shaded.
Figure 12A:
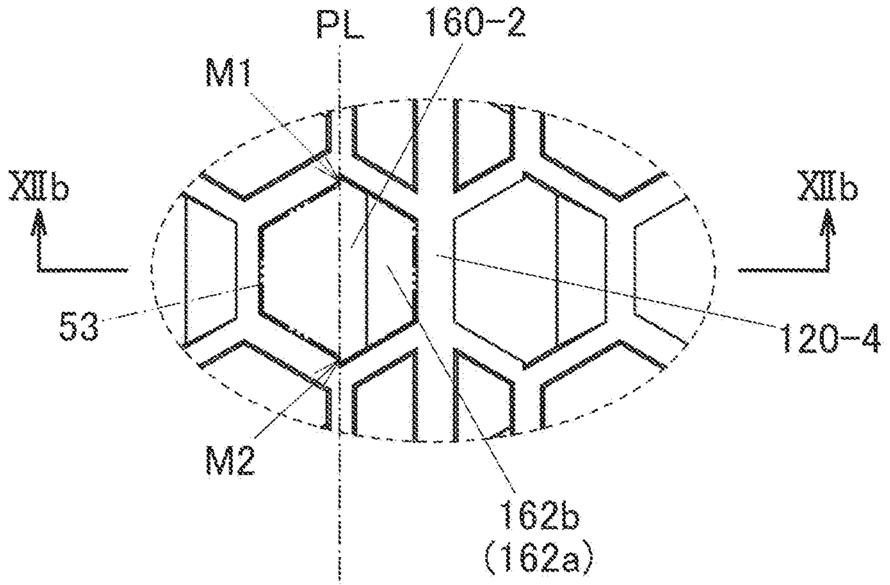
FIG. 12A is an explanatory diagram of a mold for molding the external member (the rear panel) according to the application example of the present disclosure, which is an enlarged rear view of a front side (an outer side) of the second sound radiation hole in the rear panel, which constitutes a product molded by the mold.
Figure 12B:
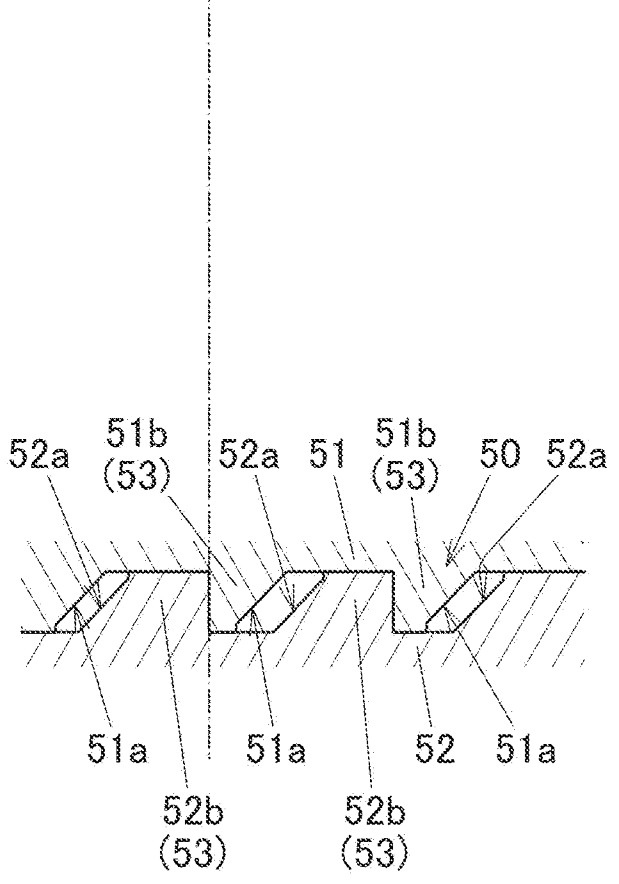
FIG. 12B is an explanatory diagram of the mold for molding the external member (the rear panel) according to the application example of the present disclosure, which is a sectional view of the mold corresponding to a sectional view taken along a line XIIb-XIIb in FIG. 12A.

A mold 50 for molding the rear panel 15 has a cavity mold 51 and a core mold 52. In FIGS. 10, 11 showing the first sound radiation section 100, shaded portions (a front side of the rear panel 15) constitute surfaces to be molded by the cavity mold 51, while blank or white portions constitute surfaces to be molded by the core mold 52. Four bosses 15*a* for attachment of the rear cover 12 are provided on an outer circumference of a front side (an outer side) of the first sound radiation section 100. Then, as shown in FIG. 11, a boss 15*b* for connection with the instrument case of the electronic keyboard instrument 10 is provided on a circumference of a rear side (an inner side) of the first sound radiation section 100.

In molding hexagonal holes in the isomorphic sound radiation holes 170, 270, hexagonal holes can be molded by providing hexagonal prism-like projections on the core mold 52. In molding the first sound radiation hole 160-1 to the third sound radiation hole 160-3, since the sloping portions (the first sloping portion 161*b* to the third sloping portion 163*b*) are provided in the first to third sound radiation holes 160-1 to 160-3, the cavity mold 51 and the core mold 52 are configured as below.

Hexagonal prisms 53 including corresponding sloping surfaces 51*a*, 52*a* which slope in the same direction on facing side surfaces thereof are provided on the mold 50 in such a manner that a pin 51*b*, which constitutes one side or part of the hexagonal prism 53 when the hexagonal prism 53 is divided along a line connecting facing apex portions M1, M2 thereof, is provided on the cavity mold 51 and a pin 52*b*, which is made up of the other side or part of the hexagonal prism 53 so divided, is provided on the core mold 52.

A molding method of the rear panel 15, which constitutes the external member, using this mold 50 includes clamping the mold 50 and injecting a molten resin into the mold 50 so clamped. Then, a frame portion 110 including a first sound radiation hole 160-1 to a third sound radiation hole 160-3 in which sloping surfaces (a first sloping surface 161*a* and the like) are provided within hole areas thereof is molded by the hexagonal prisms 53.

In this way, in the cavity mold 51 and the core mold 52 for molding the first sound radiation hole 160-1 to the third sound radiation hole 160-3, the line connecting the facing apex portions M1, M2 of the hexagonal shape constitutes a parting line PL.

Further, a molding method of the first hole frames 111, 211 and the second hole frames 112, 212 will be described using FIGS. 7A, 7B, which show a circumferential area of the isomorphic sound radiation holes 171, 172 of the first sound radiation section 100. As shown in FIG. 7B, the core mold 52 of the mold 50 includes the first pin 52*c* corresponding to the hole forming surface 111*a* of the first hole frame 111 and the second pin 52*d* corresponding to the hole forming surface 112*a* of the second hole frame 112. Then, the molding method of the rear panel 15 using the mold 50 similarly includes clamping the mold 50 and injecting a molten resin thereinto. Then, a frame portion 110 is molded which includes multiple sound radiation holes 150 including first hole frames 111 and second hole frames 112.

While FIGS. 7A and 7B illustrate the first sound radiation section 100, what is illustrated therein can also equally be applied to the first hole frames 211 and the second hole frames 212 of the second sound radiation section 200.

Thus, as has been described heretofore, in the application example of the present disclosure, the rear panel 15, which is the external member, of the electronic keyboard instrument 10 has the frame portions 110, 210 which include the multiple sound radiation holes 150, 250, respectively, and the frame portions 110, 210 have the first hole frames 111, 211, respectively, which include, respectively, the hole forming surfaces 111*a*, 211*a* of the sound radiation holes 150, 250 and the second hole frames 112, 212 which include, respectively, the hole forming surfaces 111*a*, 211*a* of the sound radiation holes 150, 250 which are longer in the thickness direction of the frame portions 110, 210 (the Y-axis direction) than the first hole frames 111, 211.

As a result, the sound radiation holes 150, 250 which are provided by the second hole frames 112, 212 can be formed into a cylindrical shape which is longer than the sound radiation holes 150, 250 which are provided by the first hole frames 111, 211. Thus, the strength of the frame portions 110, 210 can be increased even partially while increasing the directivity of sounds radiated from the sound radiation apparatus 20. Here, although it is also considered that the lengths of all the sound radiation holes 150, 250 are elongated in the axial direction thereof, in the event that this configuration is adopted, the size of the electronic keyboard instrument 10 to which the external member is attached will be increased accordingly.

In addition, the second hole frames 112, 212 are disposed in the central portions of the frame portions 110, 210, respectively. As a result, the cylindrical sound radiation holes 150, 250 which are made up of the second frames 112, 212 can easily be disposed at the center of sounds radiated from the sound radiation apparatus 20.

The sloping portions (the sixth sloping portion 166*b* and the seventh sloping portion 167*b*) including, respectively, the sloping surfaces (the sixth sloping surfaces 166*a* and the seventh sloping surfaces 167*a*) which are disposed to slope from the thickness direction of the frame portion 110 (the Y-axis direction) are provided between the second hole frames 112. As a result, the sound radiation directions of sounds can arbitrarily be set while increasing the directivity of the sounds.

Additionally, the sloping portions (the sixth sloping portion 166*b* and the seventh sloping portion 167*b*) are provided to make a pair so that the sloping surfaces (the sixth sloping surfaces 166*a* and the seventh sloping surfaces 167*a*) face each other. As a result, the space between the sloping surfaces (the sixth sloping surfaces 166*a* and the seventh sloping surfaces 167*a*) on the inner side of the rear panel 15, which is the external member, is narrowed, thereby making it possible to radiate sounds by increasing the sound pressure.

The frame portions 110,210 include, respectively, the straight-line frames 120-1 to 120-6, 220-1 to 220-6. As a result, the strength of the frame portions 110,210 can be increased further.

The frame portions 110, 210 are provided in such a manner that the outer surfaces (the outer surfaces 110*a*, 210*a*) are flat and level with each other. As a result, the inner sides of the frame portions 110, 210 are made to protrude, whereby the external appearance of the rear panel 15 is improved, and a cloth member such as a saran net can also be easily attached to the rear panel 15.

The speakers, which are the sound radiation apparatuses 20, are provided in the positions corresponding to the second hole frames 112, 212. The second hole frames 112, 212, which make up the cylindrical sound radiation holes, enable the speakers to radiate sounds whose directivity is increased.

The part of the inside of the second hole frame 112 is situated in the interior portion of the speaker cone 21 of the speaker. Since only the portion of the frame portion 110 which corresponds to the recessed portion of the speaker cone 21 enters the interior portion of the speaker cone 21, the frame portion 110 is made to hardly contact the speaker cone 21 even though the speaker cone 21 vibrates. In addition, since the frame portion 110 (the rear panel 15) can be disposed close to the speaker cone 21, the electronic keyboard instrument 10 can be made small in size.

The first sound radiation section 100 and the second sound radiation section 200 have the frame portion 110 and the frame portion 210, respectively. In addition, the length T2 of the hole forming surface 112*a*, which makes up the isomorphic sound radiation hole 172 (the sound radiation hole 150), of the second hole frame 112 of the first sound radiation section 100 which is defined in the thickness direction of the frame portion 110 is longer than the length T4 of the hole forming surface 212*a*, which makes up the sound radiation hole 250, of the second frame 212 of the second sound radiation section 200 which is defined in the thickness direction of the frame portion 210. As a result, the lengths T2, T4 of the hole forming surfaces of the first hole frames 111, 211 and the second hole frames 112, 212 can be set in accordance with the desired sound characteristics.

The rear panel 15, which is the external member, is provided on the electronic keyboard instrument 10, which is an electronic instrument. As a result, the electronic instrument can be provided which includes the external member whose strength is improved while increasing the sound directivity.

The molding method of the rear panel 15 includes clamping the mold 50 having the core mold 52 including the first pin 52*c* which corresponds to the hole forming surfaces 111*a*, 211*a* of the first hole frames 111, 211 and the second pin 52*d* which corresponds to the hole forming surfaces 112*a*, 212*a* of the second hole frames 112, 212, and the cavity mold 52, and molding the frame portions 110, 210 which include the multiple sound radiation holes 150, 250 which include the first hole frames 111, 211 and the second hole frames 112, 212 by injecting a molten resin into the mold 50. As a result, the molding method of the rear panel 15 can be provided in which the strength is improved while increasing the sound directivity.

The drafts on the hole forming surfaces 111*a*, 211*a* of the first hole frames 111, 211 and the hole forming surfaces 112*a*, 212*a* of the second hole frames 112, 212 are provided in such a manner as to expand from the outer side towards the inner side of the frame portions 110, 210, respectively. As a result, the molding method of the rear panel 15 can be provided in which the sound radiation properties are increased by increasing the sound pressure, particularly, in the isomorphic sound radiation holes 170, 270.

While the application example has been described heretofore, the application example is presented as the example, and hence, there is no intention to limit the scope of the present invention by the example. The novel application example can be carried out in other various forms, and various omissions, replacements and modifications can be made thereto without departing from the spirit and scope of the present invention. Those resulting application examples and modified examples thereof are included in the scope and gist of the present invention and are also included in the scope of inventions claimed for patent under claims below and their equivalents.

What is claimed is:

1. An external member comprising:

a frame portion comprising multiple sound radiation holes, wherein the frame portion comprises:

first hole frames each comprising a hole forming surface of a respective one of the sound radiation holes; and second hole frames each comprising a hole forming surface of a respective one of the sound radiation hole which is holes, the second hole frames being longer in a thickness direction of the frame portion than the first hole frame frames, and wherein a sloping portion including a sloping surface which is disposed to slope along the thickness direction of the frame portion is provided between the second hole frames.

2. The external member according to claim 1, wherein the second hole frames are disposed at a central portion of the frame portion.

3. The external member according to claim 1, wherein the sloping portion comprises a pair of sloping surfaces provided so as to face each other.

4. The external member according to claim 1, wherein the frame portion comprises a straight-line frame.

5. The external member according to claim 1, wherein an outer surface of the frame portion is flat and level.

6. The external member according to claim 1, wherein the second hole frame is provided at a position corresponding to a speaker.

7. The external member according to claim 6, wherein an inner portion of the second hole frame is positioned in an interior portion of a speaker cone of the speaker.

8. An external member comprising:

a first sound radiation section; and a second sound radiation section, wherein each of the first sound radiation section and the second sound radiation section comprises a frame portion comprising multiple sound radiation holes, the frame portion comprising:

first hole frames each comprising a hole forming surface of a respective one of the sound radiation holes; and second hole frames each corresponding to a hole forming surface of a respective one of the sound radiation holes, the second hole frames being longer in a thickness direction of the frame portion that the first hole frames, and wherein a length of the hole forming surfaces of the second hole frames of the first sound radiation section in the thickness direction of the frame portion is longer than a length of the hole forming surfaces of the second hole frames of the second sound radiation section in the thickness direction of the frame portion.

9. The external member according to claim 8, wherein the second hole frames are disposed at a central portion of the frame portion.

10. The external member according to claim 8, wherein a sloping portion including a sloping surface which is disposed to slope along the thickness direction of the frame portion is provided between the second hole frames.

11. An electronic instrument comprising the external member according to claim 1.

12. An external member molding method comprising:

clamping a mold comprising a core mold comprising a first pin which corresponds to a hole forming surface of a first hole frame and a second pin which corresponds to a hole forming surface of a second hole frame, and a cavity mold; and molding a frame portion comprising multiple sound radiation holes including the first hole frame and the second hole frame by injecting a molten resin into the mold, wherein drafts on the hole forming surface of the first hole frame and the hole forming surface of the second hole frame are provided in such a manner as to expand from an outer side towards an inner side of the frame portion.

* * * * *